United States Patent [19]
Elms et al.

[11] Patent Number: 5,835,321
[45] Date of Patent: Nov. 10, 1998

[54] ARC FAULT DETECTION APPARATUS AND CIRCUIT BREAKER INCORPORATING SAME

[75] Inventors: Robert T. Elms, Monroeville; John C. Schlotterer, Franklin, both of Pa.

[73] Assignee: Eaton Corporation, Cleveland, Ohio

[21] Appl. No.: 691,733

[22] Filed: Aug. 2, 1996

[51] Int. Cl.⁶ .................................................. H02H 3/16
[52] U.S. Cl. ............................... 361/45; 361/94; 364/483
[58] Field of Search .............................. 361/42, 44, 45, 361/93–94, 97, 102, 111; 364/483–487

[56] References Cited

U.S. PATENT DOCUMENTS

| | | | |
|---|---|---|---|
| 4,297,738 | 10/1981 | Lee | 361/42 |
| 4,402,030 | 8/1983 | Moser et al. | 361/93 |
| 5,121,282 | 6/1992 | White | 361/42 |
| 5,185,684 | 2/1993 | Beihoff et al. | 361/45 |
| 5,307,230 | 4/1994 | Mackenzie | 361/96 |
| 5,459,630 | 10/1995 | MacKenzie et al. | 361/45 |
| 5,602,709 | 2/1997 | Al-Dabbagh | 361/85 |

FOREIGN PATENT DOCUMENTS 9004278   4/1990   WIPO .

OTHER PUBLICATIONS

Texas A & M University—IEEE Transactions on Power Apparatus and Systems, vol. PAS–101, No. 6 Jun. 1982; *Distribution High Impedance Fault Detection Utilizing High Frequency Current Components*; by B. Mike Aucoin and B. Don Russell: pp. 1596 –1606.

Underwriters Labaratories Inc.; *Report of research on ARC–Fault Detection Circuit Breakers for National Electrical Manufacturers Association*; Rosslyn, VA 22209; Mar. 15, 1996; Project Number 95 NK6832 File Number NC3054; pp. 1–59 and i–iv and A1–B1.

*Primary Examiner*—Jeffrey A. Gaffin
*Assistant Examiner*—Michael J. Sherry
*Attorney, Agent, or Firm*—Martin J. Moran

[57] ABSTRACT

Arcing-faults in an electric power distribution system are detected by a circuit which includes a band-pass filter generating a low frequency bandwidth limited arcing current signal having a bandwidth above the measurable harmonics of the ac current but below the frequency band of power line communications systems, about 3 KHz to 20 KHz and preferably about 6 KHz to 12 KHz. For each cycle of the ac current that this low frequency bandwidth limited arcing current exceeds a threshold, preferably related to the amplitude of the ac current, for a selected duration of the cycle, a fixed pulse is generated. If a time attenuated accumulation of these fixed pulses reaches a selected level representative of a number of closely spaced cycles in which the arcing current has been detected for the selected duration, an arc indicative signal is output. Preferably, the value of the time attenuated accumulation of pulses at which the arc indicative signal is generated is variable so that fewer pulses are needed to generate the output as the amplitude of the ac current increases.

7 Claims, 4 Drawing Sheets

ARC FAULT DETECTION APPARATUS AND CIRCUIT BREAKER INCORPORATING SAME

BACKGROUND OF THE INVENTION

1. Field of the Invention

This invention relates to detection of arcing faults in an electric power distribution system and to circuit breakers which trip in response to detection of such arcing faults.

2. Background Information

It is known that arcing faults in electric power distribution systems can generate sufficient heat to start a fire at currents well below the normal trip currents of circuit breakers protecting the distribution system. Several approaches have been taken toward causing the circuit breakers to trip in response to such arcing faults. The problem is compounded by the fact that there are normal loads which produce effects which are similar to those of an arcing fault. One approach to solving this problem relies on the fact that the typical arcing fault creates broad band noise. Many arcing fault detectors look at the high frequency, or RF, content of this noise, above about 1 MHz. Such detectors often look at details of the high frequency noise signal in an attempt to distinguish the arcing fault from other phenomena. For instance, low voltage arcing faults, especially parallel arcs, can be intermittent leading to their characterization as sputtering arc faults. Thus, randomness in the high frequency noise is one of the typical criteria used for detecting an arcing fault. Other characteristics of the high frequency noise that such arcing fault detectors use include quiescent periods in the noise energy distribution and so forth. The more sophisticated arc detectors of this type utilize a microprocessor to analyze the noise making them expensive. Another problem is that many loads on a typical electrical power distribution system, such as television sets, have capacitive filters on their inputs which attenuate the RF noise, and thereby mask arcing faults.

Other devices for detection of arcing faults look for step increases in current produced each time an arc is struck. Such devices are not affected by the capacitive filters on some loads, but can be falsely triggered by loads which generate repetitive step increases such as a dimmer which is phased back. One device of this type is described in U.S. patent application Ser. No. 08/471,132 filed on Jun. 6, 1995. Pulses having a magnitude proportional to the size of the step increases in current are generated each time the arc is struck. A time attenuated accumulation of the amplitude of these pulses is compared to a fixed threshold so that fewer large or more closely spaced pulses will generate an indication of an arcing fault. While this latter type of detector is not affected by the capacitive filter provided on some loads it is more suited to detection of parallel arcing faults, that is line-to-line or line-to-ground arcing faults rather than series arcing faults resulting from a break in a lead and which tend to be more continuous.

There is room therefore for improvement in arcing fault detectors.

More particularly there is a need for improved apparatus for detection of arcing faults which is not susceptible to masking of the high frequency content of the arcing current by capacitive filtering on loads connected to the protected electric power distribution system.

There is also a need for such apparatus which is less susceptible to false tripping by other phenomena.

There is an important need for such apparatus which is affordable and reliable.

SUMMARY OF THE INVENTION

These needs and others are satisfied by the invention which is directed to apparatus for detecting arcing faults and circuit breakers incorporating such detectors which look for the presence of low frequency noise for a selected duration for a selectable number of cycles of the ac current. More particularly, the apparatus includes band pass filtering means generating a low frequency bandwidth limited current signal from a sensed current signal representing the ac current flowing in the electrical power distribution system. The low frequency bandwidth limited current signal has a frequency range which is below the radio frequencies which tend to be attenuated by capacitive filtering on certain loads found in electric power distribution systems and above measurable harmonics of the power waveform. Preferably the pass band is also below power line communication frequencies. Preferably the pass band is between about 3 KHz and 20 KHz and most preferably about 6 KHz to about 12 KHz. The apparatus further includes processing means which generates an arc indicative signal when the low frequency bandwidth limited current signal exceeds a selected threshold signal for a selected duration of a selectable number of cycles of the ac current. Preferably, the threshold signal is selected to be a function of the amplitude of the fundamental component of the ac current in the electric power distribution system. The processing means also includes a comparator generating a fixed amplitude signal whenever the low frequency bandwidth limited current signal exceeds the selected threshold signal. This fixed amplitude signal is integrated and the resultant integrated signal is compared with a reference signal selected to establish the selected duration of a cycle of the ac current during which the low frequency bandwidth limited current signal must be above the threshold. For each cycle of the ac current in which the low frequency bandwidth limited current signal exceeds the selected threshold, a pulse is generated by a synchronous comparator. A time attenuated accumulation of these pulses is generated and compared to a selected value. When the selected value is reached the arc indicative signal is generated by another comparator.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
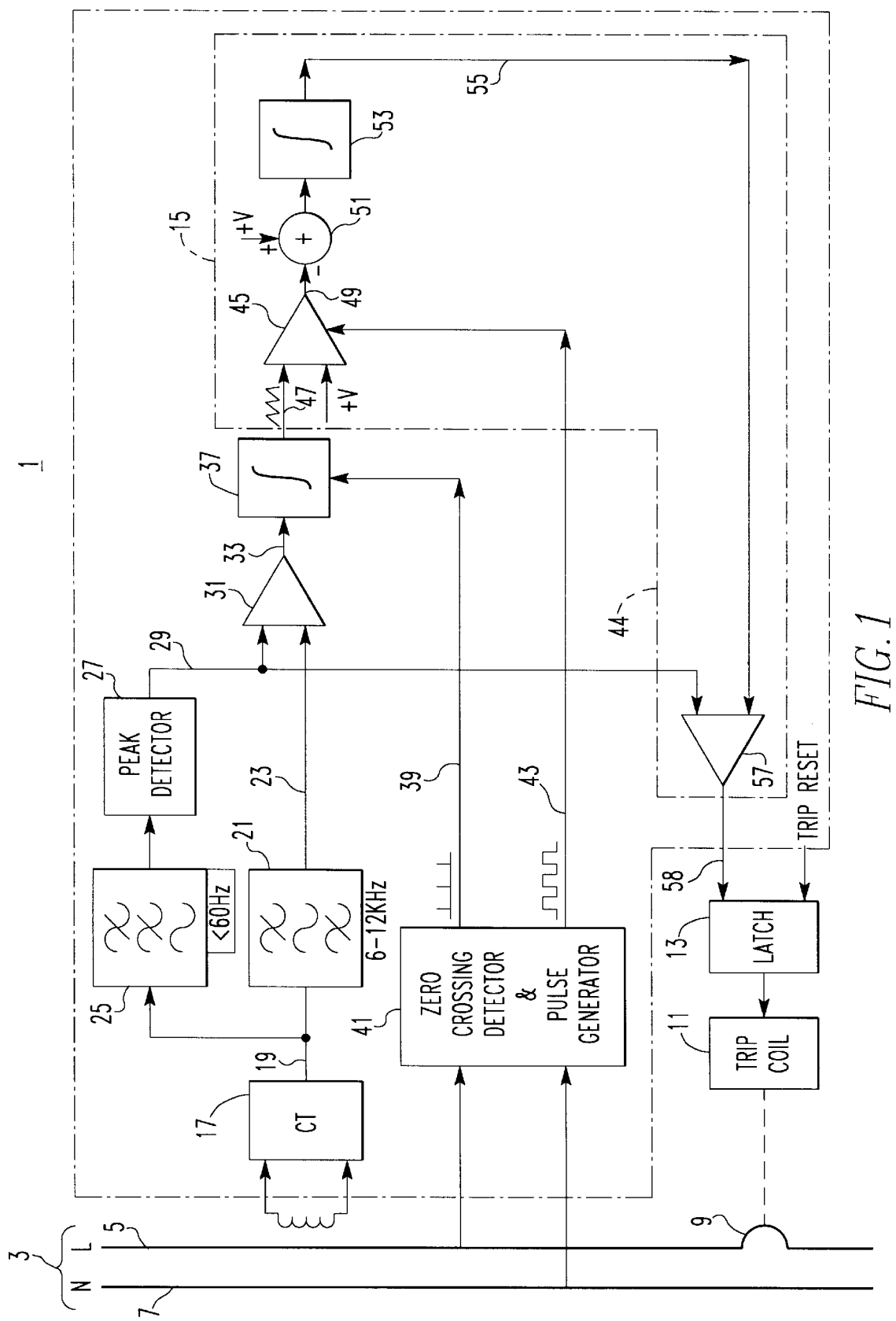
FIG. 1 is a schematic diagram in block form of a circuit breaker incorporating the arc fault trip unit of the invention.

As shown in FIG. 1, a circuit breaker 1 incorporating the invention provides protection for an electric power distribution system 3 which includes a line conductor 5 and neutral conductor 7. The circuit breaker 1 includes separable contacts 9 in the line conductor 5. The separable contacts 9 are tripped open by a trip coil 11 activated by a latch 13. In accordance with the invention, the latch can be operated by an arc fault detector unit 15 to trip the separable contacts open. Although not shown, the circuit breaker also includes a thermal-magnetic trip unit or an electronic trip unit which provides conventional overcurrent and short circuit protection for the electric power distribution system 3. In addition, a ground fault trip circuit can also be provided.

The arc fault detection unit 15 includes a current sensor which in the exemplary embodiment of the invention is a current transformer 17 which generates a sensed current signal 19 representative of the current flowing in the electric distribution system 3. The sensed current signal 19 is passed through a band pass filter 21 which, as will be seen, consists of low-pass and high-pass filtered elements with corner frequencies of 12 KHz and 6 KHz, respectively. The high-pass element effectively blocks the fundamental and all measurable harmonics of the 60 Hz power signal while the low-pass element blocks RF interference and any carrier signal of a power line communication system that may be operating on the line and neutral conductors 5 and 7. The output of the band pass filter 21 is a low frequency bandwidth-limited current signal 23 sensitive to arcing energy in the ac current wave form.

The sensed current signal 19 is also passed through a low-pass filter 25 with a corner frequency of 80 Hz and then through a peak detector 27 to generate a signal 29 proportional to the amplitude of the ac current on the leads 5 and 7. This signal 29 is used as a selected threshold signal to which the low frequency bandwidth limited current signal 23 is compared in a comparator 31. When the low frequency bandwidth limited current signal exceeds the threshold signal 29, the output of the comparator 31 goes high. The proportionality of the threshold signal 29 to the amplitude of the fundamental component of the ac power signal is selected so that the output of the comparator 31 goes high when the low frequency bandwidth limited current signal resulting from arcing is a selected proportion of the fundamental amplitude. As can be seen, this threshold level varies with the amplitude of the power wave form.

The signal 33 output by the comparator 31 is a fixed amplitude signal that remains high as long as the low frequency bandwidth limited current signal 23 exceeds the threshold of signal 29. The duration of the time that the low frequency bandwidth limited current signal 23 exceeds the threshold is measured by an integrator 37 which integrates the fixed amplitude signal 33. The integrator 37 is reset at the end of each cycle of the ac power wave form by a pulse signal 39 generated by a zero crossing detector and pulse generator 41. The pulses of the pulse signal 39 are generated on the negative-to-positive zero crossings of the ac wave form on the leads 5 and 7. The zero crossing detector and pulse generator 41 also generate a square wave signal 43 from the ac power wave form which, in the exemplary embodiment of the invention, has a 50% duty cycle that is asserted when the line voltage is greater than zero.

A response circuit 44 includes a synchronous comparator 45 which compares the integrated signal 47 output by the integrator 37 to a fixed threshold voltage +V. The output of the synchronous comparator 45 is asserted when the integrated signal 47 exceeds the reference voltage +V indicating that the integrator 37 has detected significant arc energy during the previous line-cycle. Comparison is done on the leading edge of the clock signal 43. The output 49 of the synchronous comparator 45 will be asserted for the portion of the cycle of the ac power wave form determined by the duty cycle of the clock signal 43. Thus, it can be seen that the synchronous comparator 45 generates a pulse 49 of fixed amplitude and duration for each previous half-cycle of the ac power wave form in which the low frequency bandwidth limited current signal 23 exceeded the threshold signal for the predetermined duration of the cycle determined by the voltage +V.

The fixed pulses 49 generated by the synchronous comparator 45 are applied to a leaky integrator formed by the summer 51 and integrator 53. The integrator is charged up by a fixed voltage +V applied to a + input on the summer 51. Each pulse 49 generated by the synchronous comparator 45 is applied in a negative sense to the integrator 53. Thus, the output of the integrator 53 is normally high but is pulled low by pulses indicating the presence of arcing. The current magnitudes into the summer 51 are adjusted so that the +V reference current will saturate the integrator 53 high after approximately 10 seconds and continuous arc detection will saturate the integrator low after approximately 1 second. Thus, the summer 51 and integrator 53 generate a signal 55 which is a time attenuated accumulation of the pulses 49 generated by the synchronous comparator 45.

The output 55 of the integrator 53 is applied to a trip comparator 57 which compares it with a selected reference value. In the exemplary embodiment of the invention, this reference value is provided by the signal 29 proportional to the amplitude of the line current. The output of the trip comparator 57 sets the latch 13 to generate the arc indicative signal 58 whenever the time attenuated accumulation of pulses generated by the integrator 53 is less than the threshold signal 29. Thus, line currents of larger amplitude require fewer cycles of arcing to trip the latch 13 or in other words, fewer pulses 49 are required to pull the output of the integrator 53 down to the higher level of the threshold signal 29.

Figure 2:
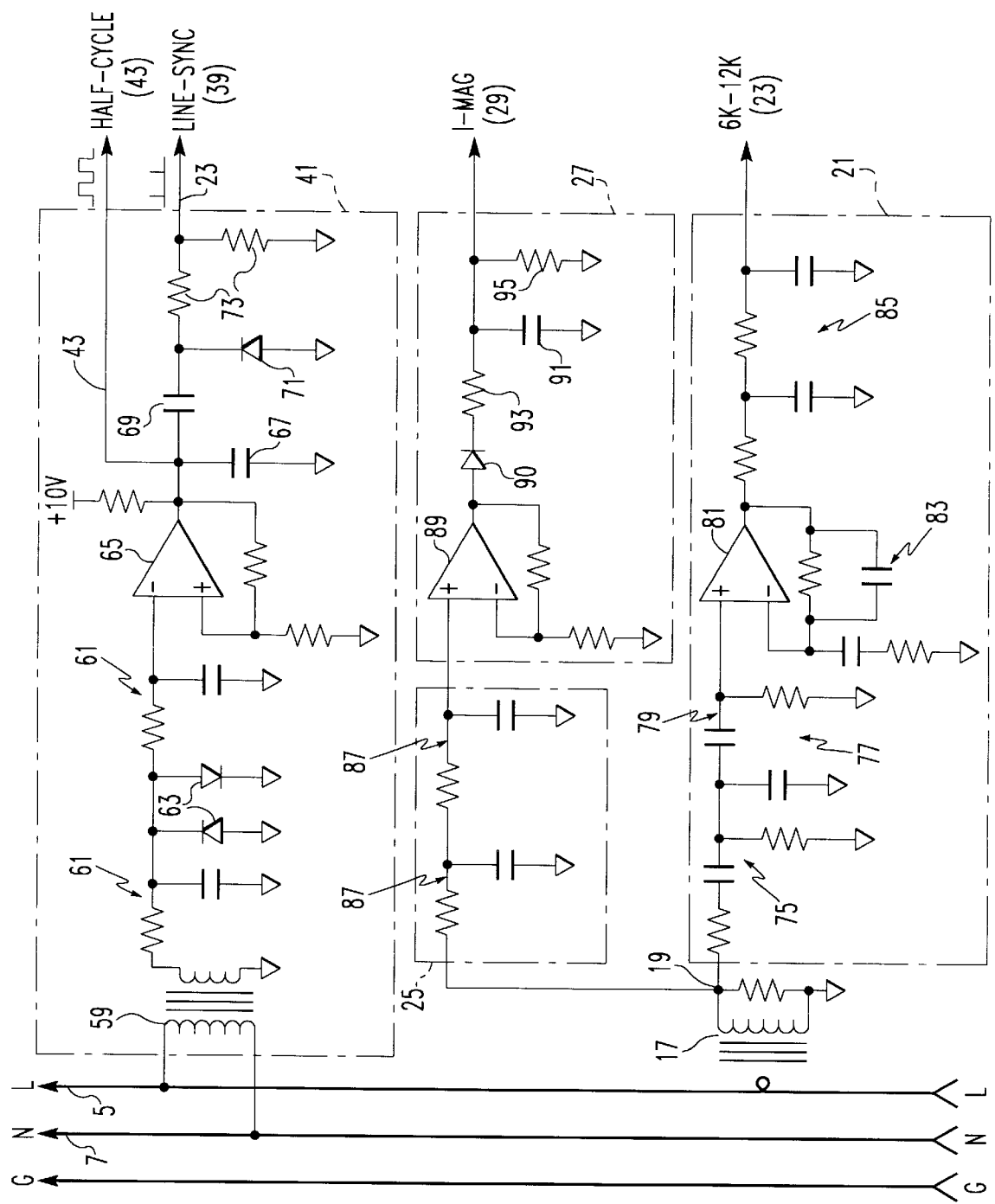
FIG. 2 is a schematic diagram of a portion of the arc fault trip unit which forms part of FIG. 1.
Figure 3:
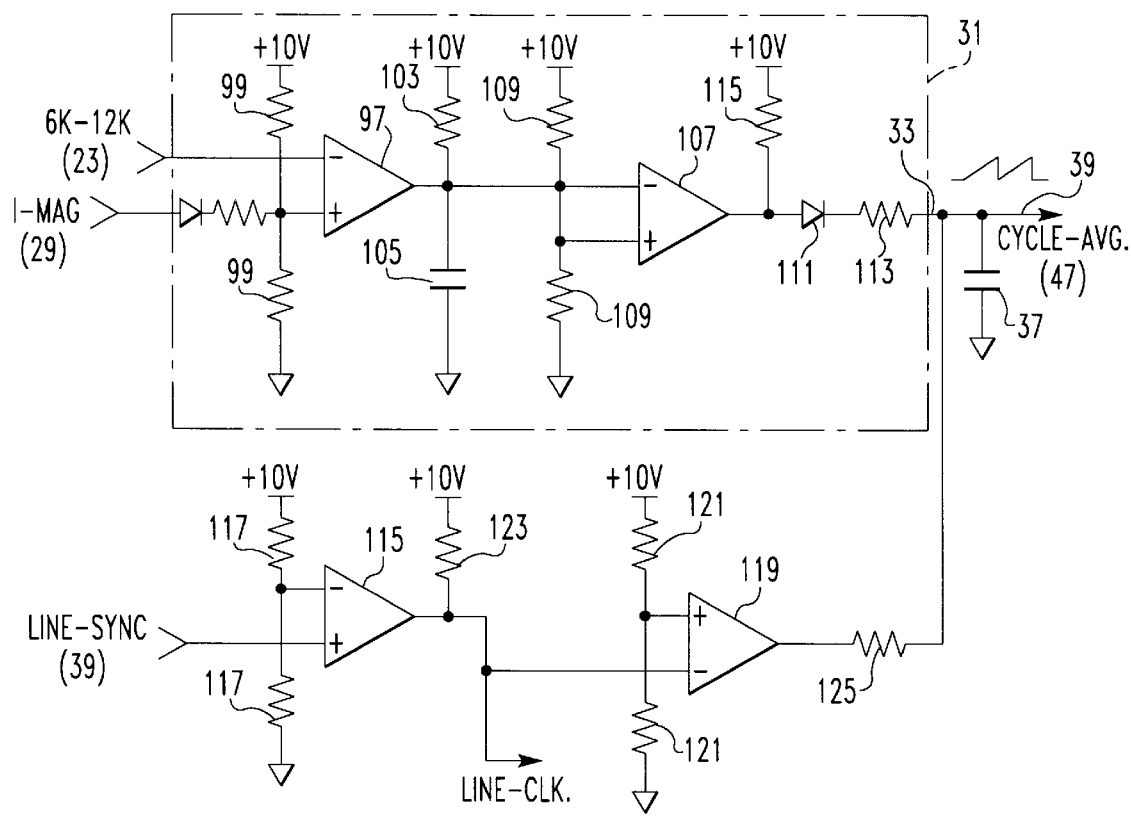
FIG. 3 is a schematic circuit diagram of another part of the arc fault trip unit which forms part of the circuit breaker of FIG. 1.
Figure 4:
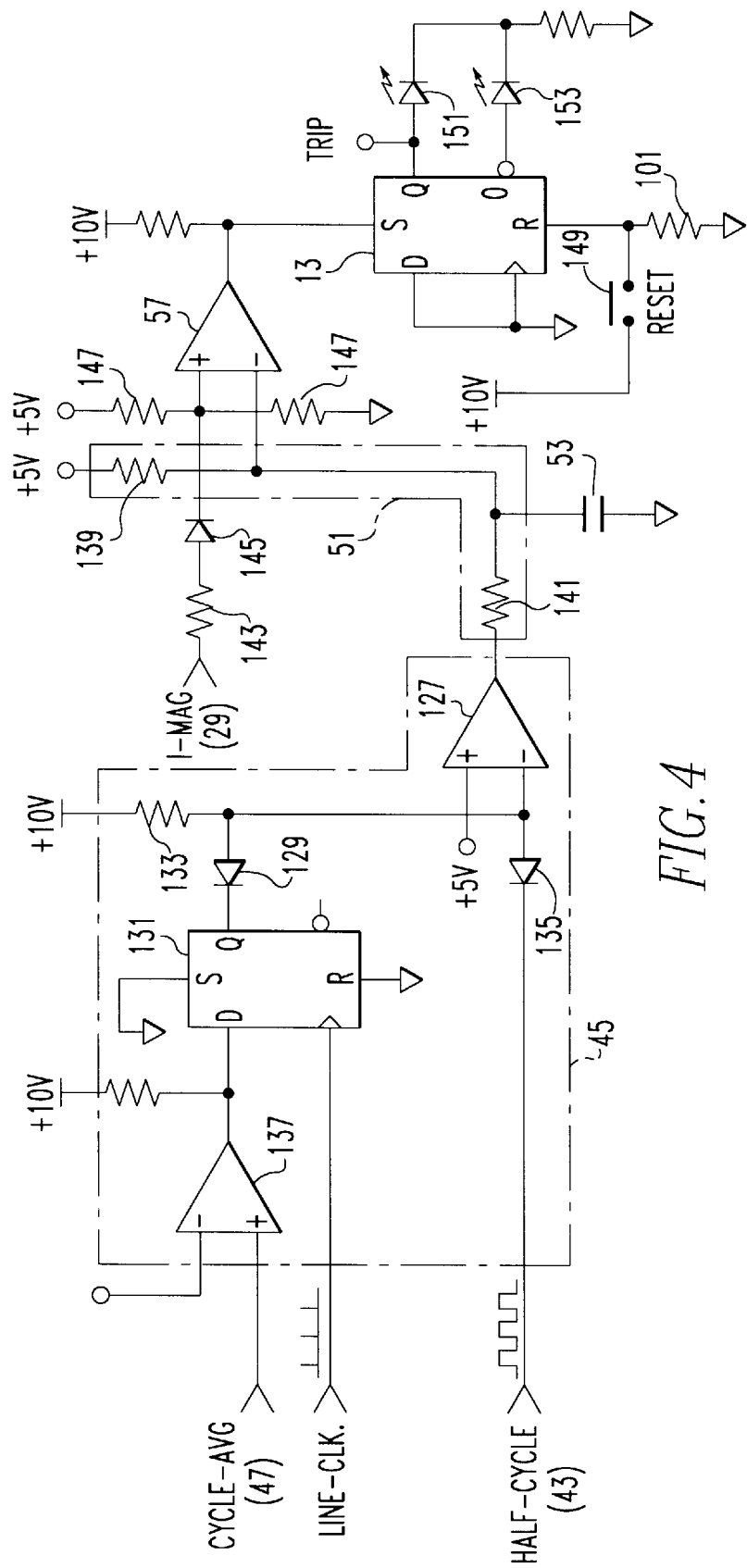
FIG. 4 is a schematic circuit diagram of yet another part of the arc fault trip unit which forms part of the circuit breaker of FIG. 1.

An exemplary embodiment of the arc fault trip unit 15 of FIG. 1 is shown in FIGS. 2–4. As can be seen in FIG. 2, the zero crossing and pulse generator 41 includes a step down transformer 59 connected across the line and neutral conductors 5 and 7. The 60 cycle fundamental component is extracted by the low pass filters 61. This fundamental component is clipped by the diodes 63 to form a square wave which is applied to the non-inverting input of operational op amplifier (op-amp) 65 to generate a HALF-CYCLE signal 43. A LINE-SYNC signal 39 is generated from the HALF-CYCLE signal 43 by a differentiator formed by capacitors 67 and 69 and resistors 73. A diode 71 removes the negative transition pulses to limit the LINE-SYNC signal 39 to positive zero crossings of the fundamental component of the ac current. A pair of resistors 73 sets the magnitude of the LINE-SYNC signal.

The band-pass filter 21 to which the sensed current signal generated by the current transformer 17 is applied includes a 6 KHz high-pass filter 75 followed by a 12 KHz low-pass filter 77 and an additional 6 KHz high-pass filter 79. The resultant signal is applied to the non-inverting input of an op-amp 81 which has a feedback circuit 83 connected to the inverting input giving it a band-pass gain characteristic. A two pole 12 KHz low-pass filter 85 is applied to the output of the op-amp 81. As discussed above, the band-pass filter 21 produces an arcing current signal having a pass band of preferably about 6 KHz to 12 KHz. The low-pass filter 25 includes two stages 87 of low-pass filtering to extract the 60 Hz from the fundamental component of the ac current flowing in the electric power distribution system. The peak detector 27 includes an op-amp 89 to which the 60 Hz fundamental component is applied. This signal is half-wave rectified by the diode 90 and applied to a capacitor 91. Series resistor 93 and shunt resistor 95 are selected so that the voltage across the capacitor 91 identified as I-MAG, tracks the envelope of the 60 Hz fundamental component of the ac current.

Turning to FIG. 3, the comparator 31 which compares the low frequency bandwidth limited arcing current signal 23 to the I-MAG threshold signal 29 includes a first comparator 97 having the threshold signal 29 applied to the non-inverting input and the low frequency bandwidth limited arcing current signal 23 applied to the inverting input. A small bias is also applied to the non-inverting input by the resistors 99 and the +10 V supply which is blocked from the peak detector 27 generating the I-MAG signal 29 by the diode 101. The resistor 103 and capacitor 105 form a pulse stretching network for the output of open collector comparator 97.

The output of the comparator 97 is applied to the inverting input of a second comparator 107 which has a fixed voltage applied to its non-inverting input through resistors 109 and the +10 V supply. The output of the comparator 107 is connected through diode 111 and resistor 113 to the integrating capacitor 37. A pull up resistor 115 provides current to charge the integrating capacitor 37 when the output of the collector comparator 107 is high. Diode 111 prevents discharge of integrating capacitor 37 when the output of comparator 107 is low.

In the absence of arcing, the output of the comparator 97 is high and hence the output of comparator 107 is low so that no charge is provided to the integrating capacitor 37. However, when the low frequency bandwidth limited arcing current signal 23 exceeds the threshold signal 29 which is proportional to the amplitude of the 60 Hz component of the ac current, the output of the comparator 97 goes low causing the output of comparator 107 to go high, thereby supplying charge to the integrating capacitor 37. The voltage of the signal supplying charge to the capacitor 37 is constant, regardless of the amount by which the low frequency bandwidth limited arcing current 23 exceeds the threshold. Thus, the voltage on the capacitor 37 represents the time that the low frequency bandwidth limited arcing current signal 23 has exceeded the threshold. This integrated signal 47 is also identified as the CYCLE-AVG signal in FIG. 3.

The integrator 37 is reset at the beginning of each cycle by the LINE-SYNC signal 39 which is applied to the non-inverting input of a comparator 115. A fixed positive voltage set by the resistors 117 and +10 v supply is applied to the inverting input of a comparator 115 so that the comparator output is normally low since the LINE-SYNC 39 signal is normally low. The output of the comparator 115, which is identified as the LINE-CLK signal is applied to the inverting input of another open collector comparator 119. This comparator 119 has a positive reference voltage set by the resistors 121 and the +10 V supply applied to its non-inverting input so that its output is normally high. Output current for the comparator 115 is provided by the +10 v supply through the pull up resistor 123. The output of the comparator 119 is connected through a resistor 125 to the integrating capacitor 37. Normally the output of the comparator 119 is high, however, no current is available to provide charge to the integrating capacitor 37 in addition to the charge supplied by the comparator 31.

At each positive zero crossing of the ac current, the LINE-SYNC signal 39 generates a pulse which causes the output of comparator 115 to go high so that the output of the comparator 119 goes low. This resets the integrator 37 by providing a discharge path through the resistor 125.

As shown in FIG. 4, the synchronous comparator 45 includes a comparator 127 having a fixed positive reference voltage applied to its non-inverting input so that normally its output is high. The inverting input of the comparator 127 is connected through a diode 129 to the Q output of the D flip-flop 131. When the Q output of D flip-flop 131 is high, a ten volt signal is applied to the inverting input of the comparator 127 through the resistor 133, thereby causing the output of comparator 127 to go low. This can only occur, however, if the comparator 127 is enabled by the HALF-CYCLE signal 43 applied through the diode 135 during the positive cycle of the ac current. In other words, the diodes 129 and 135 together with resistor 133 form an AND gate for the output of flip-flop 131 and signal HALF-CYCLE 43.

The output of the D flip-flop 131 is dependent upon the duration of the previous cycle that the low frequency bandwidth limited arcing current signal 23 exceeded the threshold signal 29. This in turn is represented by the magnitude of the integrated signal 47 generated by the integrator 37. This integrated signal 47 is applied to the non-inverting input of a comparator 137. The reference for the duration is set by a selectable reference voltage applied to the inverting input of the comparator 137. The Q output of the D flip-flop 131 is determined by the value of the signal applied to its D input which is connected to the comparator 137 when the flip-flop is clocked, which in the exemplary system is at the beginning of each cycle of the ac current when the LINE-CLK signal pulses are generated. Thus, if the low frequency bandwidth limited arcing current 23 exceeds the threshold value for more than the predetermined duration of a preceding cycle so that the voltage on the integrating capacitor 37 exceeds the reference voltage applied to the comparator 137, the Q output of the D flip-flop 131 will go high when the flip-flop is gated by the pulse in the LINE-CLK signal. This will result in the output of the comparator 127 going high for ½ cycle when enabled by the HALF-CYCLE signal 43. Notice that the comparator 127 generates an output pulse of fixed amplitude for ½ cycle whenever the low frequency bandwidth limited arcing current 23 exceeds the threshold value for the predetermined duration of a cycle of the ac current independent of the amount that the threshold is exceeded and independent of the amount that the threshold duration is exceeded.

The time attenuated accumulation of the pulses generated by this synchronous comparator 45 is maintained in the integrator formed by the capacitor 53. This capacitor 53 is charged from the +5 V supply through a resistor 139. This resistor 139 and a resistor 141 through which the pulse from the synchronous comparator 45 is applied to the capacitor 53, form the summer 51 of FIG. 1. The capacitor 53 is charged by the +5 V supply and discharged by the negative pulses generated by the synchronous comparator 45. The discharge rate is greater than the charging rate so that repeated pulses generated by the synchronous comparator 45 pulls down the voltage on the integrating capacitor 53. This voltage is compared to a reference value in the trip comparator 57. As mentioned, it is preferred that the reference value be related to the magnitude of the ac current so that larger currents will require fewer pulses to generate a trip, preferably matching the conductor damage curve defined by NEMA PB 2.2-1988. Thus, the I-MAG signal 29 is applied to the non-inverting input of the comparator 57 through resistor 143 and diode 145. A small bias is provided by the +5 V supply and the resistors 147 is added to the threshold signal. The output of the trip comparator 57 is applied to the set input S of a flip-flop forming the latch 13 so that when the time attenuated accumulation of pulses representing cycles in which arcing current above the threshold were observed for a predetermined duration, the Q output of the latch 13 goes high to provide a trip signal. The latch 13 is reset manually by depressing a reset button 149. Light emitting diodes 151 and 153 in the circuit of FIG. 4 illuminate to indicate a trip and no trip condition, respectively. As indicated from FIG. 1, the trip signal can be used to trip the separable contacts 9 of the circuit breaker 1 open. The circuit can also be used for instance in a receptacle to provide an indication of an arcing condition by illumination of the led 151.

While specific embodiments of the invention have been described in detail, it will be appreciated by those skilled in the art that various modifications and alternatives to those details could be developed in light of the overall teachings of the disclosure. For instance, while the invention has been shown as being fully implemented by discrete components some or all of the required functions could be performed by a microprocessor. Accordingly, the particular arrangements disclosed are meant to be illustrative only and not limiting as to the scope of invention which is to be given the full breadth of the claims appended and any and all equivalents thereof.

What is claimed is:

1. Apparatus for detecting arcing in an ac electric power distribution system, said apparatus comprising:

sensing means generating a sensed current signal representing ac current flowing in said electric power distribution system;

band pass filtering means generating a low frequency bandwidth limited arcing current signal;

processing means generating an arc indicative signal when said low frequency bandwidth limited arcing current signal exceeds a selected threshold signal for a selected duration of a selectable number of cycles of said ac current; and wherein said processing means includes threshold signal generating means generating said selected threshold signal as a function of amplitude of a fundamental component of said ac current.

2. Apparatus for detecting arcing in an ac electric power distribution system, said apparatus comprising:

sensing means generating a sensed current signal representing ac current flowing in said electric power distribution system;

band pass filtering means generating a low frequency bandwidth limited arcing current signal;

processing means generating an arc indicative signal when said low frequency bandwidth limited arcing current signal exceeds a selected threshold signal for a selected duration of a selectable number of cycles of said ac current;

wherein said processing means includes a comparator generating a fixed amplitude signal whenever said low frequency band width limited arcing current signal exceeds said selected threshold signal, an integrator integrating said fixed amplitude signal to generate an integrated signal, and means responsive to said integrated signal to generate said arc indicative signal when said integrated signal exceeds a selected reference signal for said selectable number of cycles of said ac current, said reference signal being selected to establish said selected duration of cycles of said ac current that said low frequency bandwidth limited arcing current signal must exceed said selected threshold signal; and wherein said processing means includes threshold signal generating means generating said selected threshold signal as a function of amplitude of a fundamental component of said ac current.

3. Apparatus for detecting arcing in an ac electric power distribution system, said apparatus comprising:

sensing means generating a sensed current signal representing ac current flowing in said electric power distribution system;

band pass filtering means generating a low frequency bandwidth limited arcing current signal;

processing means generating an arc indicative signal when said low frequency bandwidth limited arcing current signal exceeds a selected threshold signal for a selected duration of a selectable number of cycles of said ac current;

wherein said processing means includes a comparator generating a fixed amplitude signal whenever said low frequency band width limited arcing current signal exceeds said selected threshold signal, an integrator integrating said fixed amplitude signal to generate an integrated signal, and means responsive to said integrated signal to generate said arc indicative signal when said integrated signal exceeds a selected reference signal for said selectable number of cycles of said ac current, said reference signal being selected to establish said selected duration of cycles of said ac current that said low frequency bandwidth limited arcing current signal must exceed said selected threshold signal; and wherein said means responsive to said integrated signal comprises a synchronous comparator generating a pulse for each cycle of said ac current for which the integrated signal exceeds said selected reference signal; means generating a time attenuated accumulation of said pulses, and means generating said arc indicative signal when said time attenuated accumulation of said pulses reaches a selected value.

4. The apparatus of claim 3 wherein said means generating said arc indicative signal includes means comparing said time attenuated accumulation of pulses to a signal which varies with amplitude of a fundamental component of said ac current so that said selected value changes to generate said arc indicative signal in fewer cycles of said ac current as said ac current increases in amplitude.

5. The apparatus of claim 4 wherein said processing means includes threshold signal generating means generating said selected threshold signal as a function of amplitude of a fundamental component of said ac current.

6. A circuit breaker responsive to arcing in an ac electric power distribution system, said circuit breaker comprising:

separable contacts connected in said electric power distribution system;

sensing means generating a sensed current signal representing ac current flowing in said electrical power distribution system;

band pass filtering means generating a low frequency bandwidth limited arcing current signal from said sensed current signal;

processing means generating an arc indicative signal when said low frequency bandwidth limited arcing current signal exceeds a selected threshold signal for a selected duration of a selectable number of cycles of said ac current;

trip means responsive to said arc indicative signal for opening said separable contacts; and wherein said processing means comprises means generating a pulse for each cycle of said ac current in which said low frequency bandwidth limited arcing current signal exceeds the selected threshold signal, means generating a time attenuated accumulation of said pulses; and means generating said arc indicative signal when said time attenuated accumulation of said pulses reaches a predetermined value.

7. The circuit breaker of claim 6 wherein said processing means includes means varying said predetermined value as a function of amplitude of a fundamental component of said ac current in a manner so that said arc indicative signal is generated and in response to fewer pulses for greater amplitude of said ac current.

* * * * *